United States Patent [19]

Honda

[11] Patent Number: 4,950,072

[45] Date of Patent: Aug. 21, 1990

[54] PRESENTATION DEVICE FOR OVERHEAD PROJECTOR

[75] Inventor: Masami Honda, Tokyo, Japan

[73] Assignee: Kabushiki Kaisha Toshiba, Kawasaki, Japan

[21] Appl. No.: 342,782

[22] Filed: Apr. 25, 1989

[30] Foreign Application Priority Data

Apr. 28, 1988 [JP] Japan .............................. 63-57837[U]

[51] Int. Cl.$^5$ ............................................ G03B 21/54
[52] U.S. Cl. .............................. 353/122; 353/DIG. 5; 353/61; 350/330
[58] Field of Search ................. 353/120, 122, DIG. 5, 353/DIG. 3, 60, 61; 350/331 B, 333, 330

[56] References Cited

U.S. PATENT DOCUMENTS

| | | | |
|---|---|---|---|
| 4,248,508 | 2/1981 | Watkin | 353/120 |
| 4,257,695 | 3/1981 | Langworthy | 353/61 |
| 4,787,738 | 11/1988 | Joffe | 353/DIG. 5 |

FOREIGN PATENT DOCUMENTS 2450417 4/1986 Fed. Rep. of Germany ........ 353/60
3711541 10/1988 Fed. Rep. of Germany ...... 353/122
63-46416 2/1988 Japan .
63-48532 3/1988 Japan .

Primary Examiner—William A. Cuchlinski, Jr.
Assistant Examiner—William C. Dowling
Attorney, Agent, or Firm—Finnegan, Henderson, Farabow, Garrett and Dunner

[57] ABSTRACT

A presentation device for an overhead projector of this invention includes a frame-shaped casing, a transmissive-type liquid crystal panel fixed in the casing, first and second protective covers mounted on the casing to have predetermined gaps from the liquid crystal panel and to cover both surfaces of the liquid crystal panel, and exhaust fans disposed in the casing. In order to detachably mount the first and second protective covers to the casing, locking pawls and locking pieces which can be elastically deformed are formed on the outer edges of the first and second protective covers, and the notches and fitting holes to which the locking pawls and the locking pieces can be respectively fitted are formed in the casing.

10 Claims, 4 Drawing Sheets

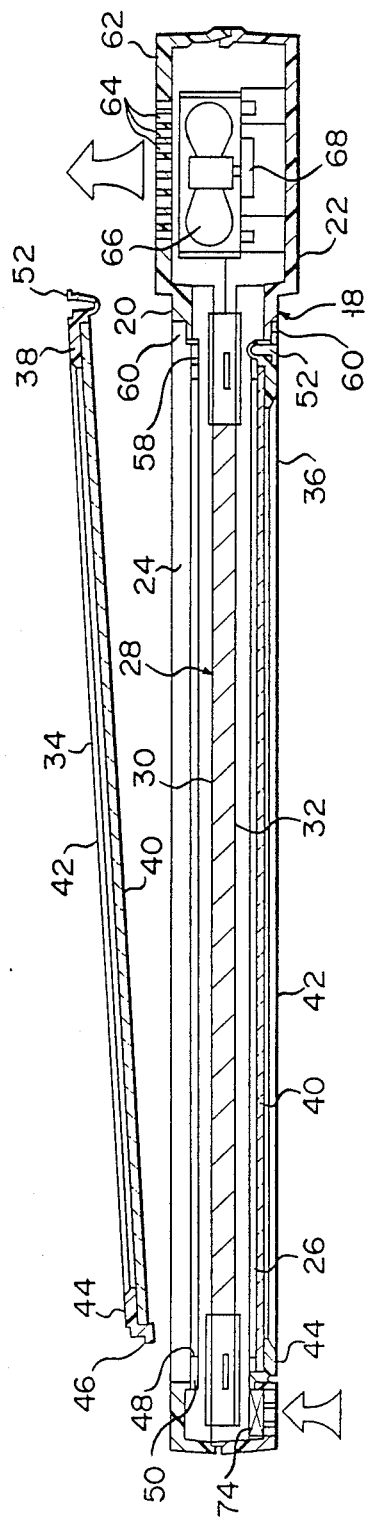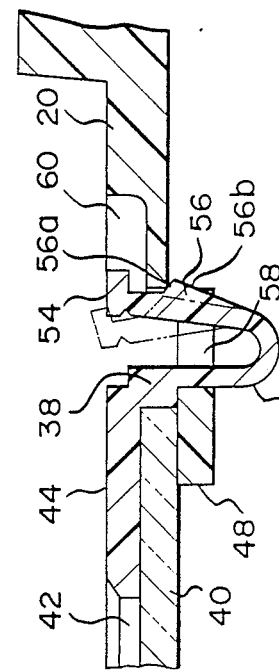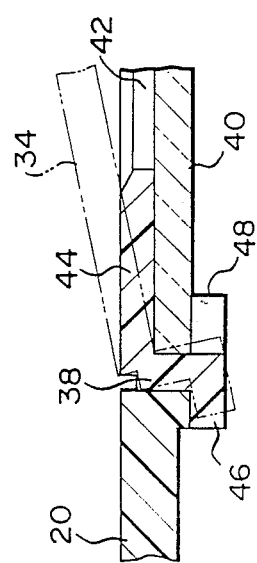

PRESENTATION DEVICE FOR OVERHEAD PROJECTOR

BACKGROUND OF THE INVENTION

1. Field of the Invention

The present invention relates to a presentation device used in a combination with an overhead projector for projecting an image on a screen and, more particularly, to a presentation device placed on the stage of the overhead projector and used in place of a reference such as an original or a graph.

2. Description of the Related Art

An overhead projector is used to enlarge and project a reference on a screen in a place where many people gather, such as a conference, a lecture, and a seminar. Therefore, the overhead projector includes a projector unit which has a transparent stage for placing a reference, a light source incorporated in the projector unit to emit light through the stage. The overhead projection further includes a magnifying reflecting mirror disposed outside the projector unit and above the stage to reflect the light passing through the stage, i.e., the reference, onto the screen.

In the above-mentioned overhead projector, a reference to be placed on the stage must be a transparent film in which data to be projected is written, in consideration of the principle of projection to the screen. For this reason, when the overhead projector is used, it takes long time to prepare the reference. In addition, when the number of pages of the reference to be projected is large, it also takes long time to change the reference on the stage.

In consideration of the above situation, recently, a panel unit including a transmissive-type liquid crystal panel is available in place of a reference of a transparent film. More specifically, a panel unit, i.e., a liquid crystal panel is connected to a so-called personal computer, in particular, to a portable personal computer, and is usable as a presentation device of the personal computer. Therefore, the liquid crystal panel of the panel unit receives an image signal from the personal computer, and can present an image in response to the image signal.

When the above-mentioned panel unit is used, it is placed on the stage of the overhead projector. However, the liquid crystal panel of the panel unit tends to be adversely affected by heat from the light source in the overhead projector. For this reason, a cooling fan as in the above personal computer may be disposed in the panel unit. If such a cooling fan is disposed, outer air can be forcibly introduced in the panel unit. The introduced air is exhausted from the panel unit, so that the liquid crystal panel in the panel unit can be cooled with air.

As described above, the liquid crystal panel in the panel unit is forcibly cooled with air, so that the adverse effect on the liquid crystal panel due to heat is considerably reduced. However, in this case, dust in the air fed in the panel unit is attached to the upper and lower surfaces of the liquid crystal panel and the inner surfaces of a pair of transparent protective covers which are disposed on the panel unit. For this reason, when the panel unit is used, the upper and lower surfaces of the liquid crystal panel and the inner surfaces of the pair of transparent covers must be constantly cleaned.

The above-mentioned pair of transparent protective covers, however, are integrally formed with a casing of the panel unit, or are mounted to the casing with set screws, in the normal case. Therefore, the abovementioned cleaning cannot be easily performed.

SUMMARY OF THE INVENTION

It is an object of the present invention to provide a presentation device which incorporates a liquid crystal panel, can forcibly feed outer air therein to cool the liquid crystal panel with air, and allows easy cleaning of the liquid crystal panel and protective covers of the liquid crystal panel.

The above object is achieved by the presentation device for an overhead projector according to the present invention, the presentation device comprising:

a frame-shaped casing for defining first and second openings opposing each other;

a transmissive-type liquid crystal panel fixed in the casing, the liquid crystal panel having first and second surfaces respectively opposing the first and second openings;

a first protective cover spaced apart from the first surface of the liquid crystal panel by a predetermined gap, and positioned to close the first opening of the casing, the first protective cover having transparent area through which the first surface of the liquid crystal panel can be externally observed;

a second protective cover spaced apart from the second surface of the liquid crystal panel by a predetermined gap, and positioned to close the second opening of the casing, the second protective cover having a transparent area through which the second surface of the liquid crystal panel can be externally observed;

first engaging means for detachably engaging the first protective cover with the casing in a fitting manner;

second engaging means for detachably engaging the second protective cover with the casing in a fitting manner; and cooling means for cooling the liquid crystal panel by feeding outer air in the casing, causing the outer air to flow along the first and second surfaces of the liquid crystal panel, and thereafter exhausting the air from the casing.

According to the above-mentioned presentation device, since the cooling means is provided, the first and second surfaces of the liquid crystal panel in the casing are effectively cooled with outer air. Therefore, even if the presentation device is used for long time, the operation of the liquid crystal panel can be kept stable.

Both the first and second protective covers in the presentation device of the present invention are engaged with the casing in a fitting manner to be mounted to the casing. Therefore, the first and second protective covers can be easily removed from the casing without removing a fixing unit such as a set screw, or without disassembling the casing itself. In other words, the first and second surfaces of the liquid crystal panel, and the inner surfaces of the first and second protective covers can be easily accessed, so that these surfaces can be easily cleaned as needed.

BRIEF DESCRIPTION OF THE DRAWINGS

FIG. 2 is a longitudinal sectional view of the presentation device shown in FIG. 1;

FIG. 3 is a sectional view showing an engaging portion on one side of a first protective cover with respect to a casing of the presentation device shown in FIG. 1;

FIG. 4 is a sectional view showing an engaging portion on the other side of the first protective cover with respect to the casing of the presentation device shown in FIG. 1;

DETAILED DESCRIPTION OF THE PREFERRED EMBODIMENTS

Figure 1:
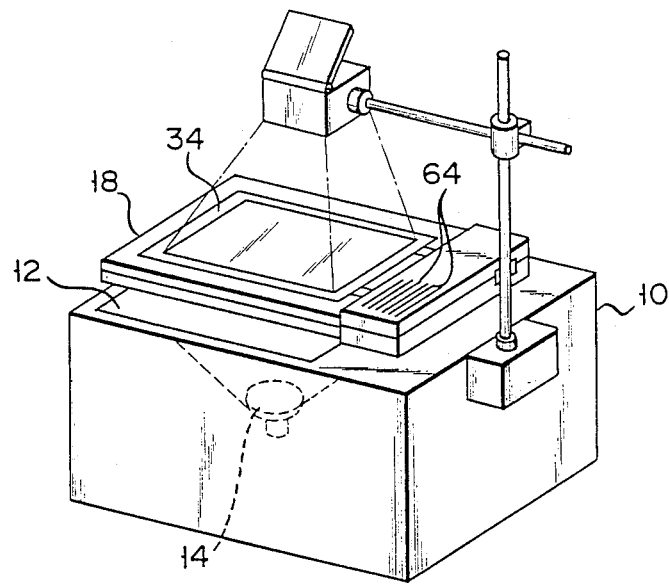
FIG. 1 is a prospective view of a presentation device, placed on a stage of an overhead projector, according to an embodiment of the present invention.

Referring to FIG. 1, an overhead projector 10 is schematically shown. Since the overhead projector 10 is generally known, the detailed description thereof is omitted. The overhead projector 10 includes a stage 12 placed on its upper surface to serve as a placing surface of a reference to be projected, and a light source 14 disposed in the projector 10 to emit light upward through the stage 12.

A presentation device 16 according to the present invention is placed on the stage 12. As is apparent from FIG. 2, the presentation device 16 includes a rectangular frame-shaped casing 18. More specifically, the casing 18 is formed by coupling upper and lower casings 20 and 22 of a synthetic resin to each other. First and second openings 24 and 26 are defined by the upper and lower casings 20 and 22, respectively. The first and second openings 24 and 26 are positioned to oppose each other, and they have the same shapes and sizes. In this embodiment, the first and second openings 24 and 26 have rectangular shapes.

As shown in FIG. 2, a transmissive-type liquid crystal panel 28 is disposed in the casing 18 to divide the inner space of the casing 18 into two chambers. The liquid crystal panel 28 also has a rectangular shape, as those of the first and second openings 24 and 26, and is fixed by fixing means (not shown) in the casing 18. In this case, since the liquid crystal panel 28 is generally known, a detailed description thereof is omitted. The liquid crystal panel 28 has first and second surfaces 30 and 32 respectively opposing the first and second openings 24 and 26, and an image in response to an image signal from a personal computer (not shown) can be displayed in the liquid crystal panel 28.

Note that a predetermined gap is defined between the outer surface of the liquid crystal panel 28 and the inner wall of the casing 18.

A first protective cover 34 is detachably fitted on the casing 18, i.e., the upper casing 20, to close the first opening 24. On the other hand, a second protective cover 36 is detachably fitted on the lower casing 22 to close the second opening 26. In FIG. 2, only the second protective cover 36 is mounted to the casing 18, and the mounting state of the first protective cover 34 to the upper casing 20 is shown in FIG. 1.

Since the first and second protective covers 34 and 36 have the same structures except a part, only the first protective cover 34 will be described below in this embodiment. The first protective cover 34 includes a frame 38 of an opaque synthetic resin. The frame 38 has substantially the same shape and size as those of the first opening 24. Therefore, the frame 38 can be fitted in the first opening 24. Referring to FIG. 2, a mounting flange 44 integrally extends from an upper inner edge portion of the frame 38. The mounting flange 44 extends along the inner edge of the frame 38. A cover plate 40 of a transparent synthetic resin is mounted on the frame 38 so that the outer edge of the plate 40 overlaps an inner end face of the mounting flange 44. The cover plate 40 is fixed to the mounting flange 44 with, e.g., an adhesive. The cover plate 40 closes an opening defined by the frame 38, i.e., an opening 42 defined by the inner edge of the mounting flange 44 in this embodiment, flange 44 in this and the opening 42 has the same size and shape as those of the presentation region of an image to be presented on the liquid crystal panel 28.

Figure 5:
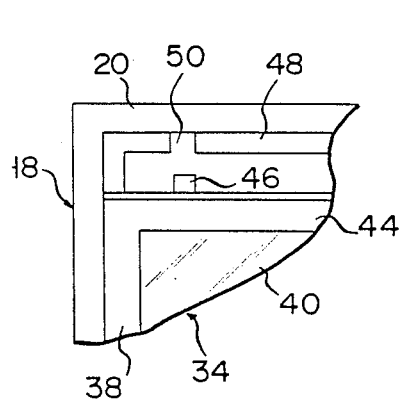
FIG. 5 is a plan view showing a disengaged state of the engaging portion in FIG. 3.

A pair of locking pawls 46 integrally extend from one side of the frame 38, i.e., a lower edge of one short side of the frame 38, in this embodiment. On the other hand, a holding flange 48 for holding the outer edge of the first protective cover 34 is integrally formed with the casing 18, i.e., a lower inner edge defining the first opening 24 in the upper casing 20. As shown in FIG. 5, notches 50 are respectively formed in the holding flange 48 in correspondence with the locking pawls 46, respectively. As is apparent from FIG. 2, each notch 50 is formed in the holding flange 48 so as to cut a lower inner edge of the upper casing 20.

Figure 6:
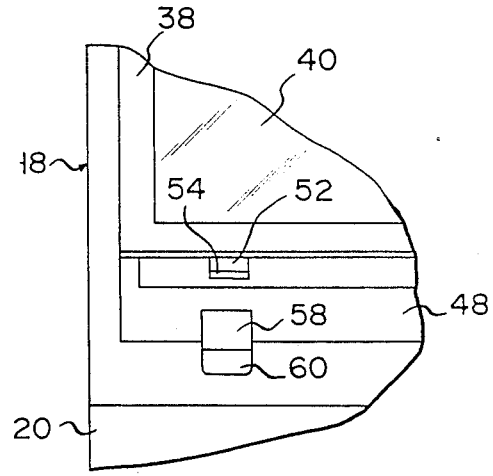
FIG. 6 is a plan view showing a disengaged state of the engaging portion in FIG. 4.

A pair of locking pieces 52, which can be elastically deformed, integrally extend from the other short side of the frame 38. More specifically, as shown in an enlarged view in FIG. 4, each locking piece 52 has a U-shape extending downward from the frame 38. One end of the locking piece 52 is integrally connected to the frame 38, and its other end is formed as a finger hook 54 which extends to the opposite side with respect to the frame 38. Therefore, when a user hooks his or her finger on the hook 54, the locking piece 52 can be elastically deformed, as represented by an alternate long and two short dashes line in FIG. 4. In addition, in each locking piece 52, a corresponding locking pawl 56 integrally projects from the end face on the hook 54 side. Each locking pawl 56 has an inclined locking surface 56a opposing the hook 54, and a tapered surface 56b smoothly extending from the edge of the locking surface 56a to the curved outer surface of the locking piece 52. On the other hand, fitting holes 58 respectively corresponding to the pair of locking pieces 52 are formed in the holding flange 48. As is apparent from FIGS. 4 and 6, each fitting hole 58 has a size in which the corresponding locking piece 52 can be inserted. In addition, a recess 60 is formed in a position of the upper casing 20 corresponding to each fitting hole 58. Each recess 60 has a size in which at least a finger can be inserted.

As represented by an alternate long and two short dashes line in FIG. 3, the above-mentioned first protective cover 34 can be mounted to the casing 18 as follows. When the first protective cover 34 is inclined so that its one short side with the pair of locking pawls 44 is in a lower position, the locking pawls 44 are inserted in the corresponding notches 50 on the casing 18 side. Then, the other short side of the first protective cover 34 with the locking pieces 52 is pushed down toward the casing 18, so that each of the pair of locking pieces 52 is inserted in the corresponding fitting hole 58 on the casing 18 side upon elastic deformation. As a result, the first protective cover 34 can be mounted to the casing 18. Note that the upper surface of the first protective cover 34 thus mounted and the outer surface of the casing 18, i.e., the upper casing 20 are even in level. In addition, note that the hook 54 of each of locking pieces 52 of the first protective cover 34 is positioned in the corresponding recess 60 of the upper casing 20, as shown in FIG. 4.

In order to remove the first protective cover 34 mounted on the casing 18, a finger is hooked on the hook 54 of each locking piece 52, and the locking piece 52 is elastically deformed, as represented by the alternate long and two short dashes line in FIG. 4. In this state, the first protective cover 34 is moved upward, so that the first protective cover 34 can be removed from the casing 18.

The structure of the second protective cover 36 itself, and the fitting structure of the second protective cover 36 with respect to the casing 18, i.e., the lower casing 22, are the same as in those of the abovementioned first protective cover 34. Therefore, the same reference numerals in the second protective cover 36 denote the same members constituting the first protective cover 34 itself, and the same portions each having the same function as those of the portions utilized for fitting of the first protective cover 34, and a description thereof is omitted.

Referring to FIG. 2, again, a circuit box 62 is integrally coupled to one short side of the casing 18. The internal space of the circuit box 62 communicates with the internal space of the casing 18. In FIG. 2, a large number of slits 64 are formed on a part of the upper wall of the circuit box 62. In the circuit box 62, a pair of exhaust fans are disposed to be adjacent to and oppose the slits 64. The exhaust fans 66 are rotated by electric motors 68, respectively.

Figure 7:
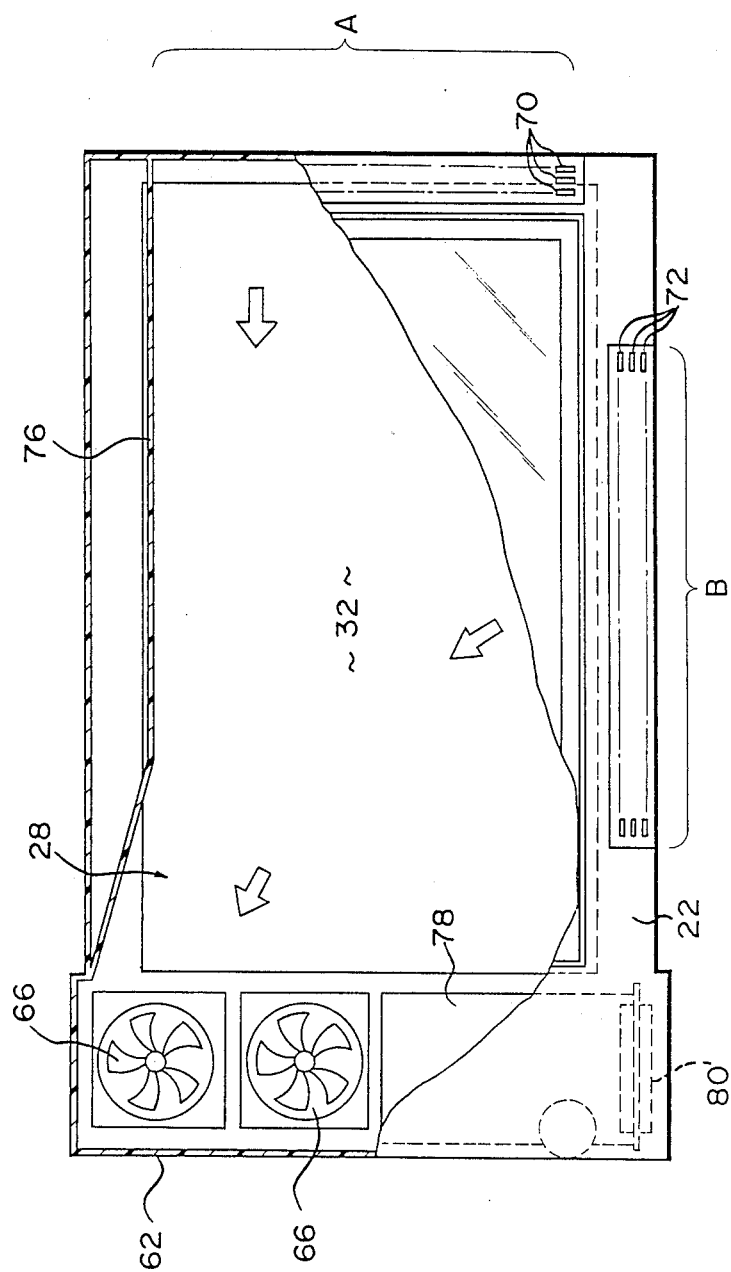
FIG. 7 is a partially cutaway bottom view of the presentation device.

As shown in FIG. 7, a large number of openings 70 are formed on the lower surface of the other short side of the casing 18, i.e., the lower surface of the short side of the lower casing 22, so as to form rows along the short side. In addition, a large number of openings 72 are formed on the lower surface of a long side of the lower casing 22 so as to form rows along the long side. Furthermore, in the lower casing 22, air filters 74 (shown in FIG. 2) are respectively disposed in regions A and B in which the openings 70 and 72 are respectively formed. The region A is formed in a range which covers a short side of the liquid crystal panel 28, and the region B is formed in a range which covers at least a central region of a long side of the liquid crystal panel 28. Note that only the air filter 74 which cooperates with the openings 70 is shown in FIG. 2.

As shown in FIG. 7, a pair of guide plates 76 are disposed in the casing 18. The guide plates 76 extend from the inner end wall of the casing 18 on the region A side along a side edge of the liquid crystal panel 28 opposite to the region B, so as to clamp the liquid crystal panel 28, and is coupled to the inner wall of the casing 18. In this embodiment, the guide plates 76 are integrally formed with the upper and lower casings 20 and 22, respectively. Therefore, these guide plates 76 serve as reinforcing ribs of the upper and lower casings 20 and 22, and as supporting means of the liquid crystal panel 28.

Note that, as schematically shown in FIG. 7, a circuit board 78 on which circuit elements (not shown) are mounted is disposed in the circuit box 62. Although not shown in FIG. 7, the circuit board 78 is electrically connected to the liquid crystal panel 28, and has a connector 80 for connection with a personal computer. The connector 80 is exposed to the outer surface of the circuit box 62, as matter of course. In addition, although not shown in FIG. 7, legs are mounted to the lower surface of the casing 18. When the presentation device 16 is placed on the stage 12 of the overhead projector 10, a predetermined gap can be formed between the stage 12 and the presentation device 16 by the legs.

When the above-mentioned pair of exhaust fans 66 are rotated, air in the casing 18 is exhausted through the slits 64. Thus, when the air in the casing 18 is exhausted, the pressure in the casing 18 is negative. Therefore, outer air is fed in the casing 18 through the openings 70 and 72 respectively formed in the regions A and B. In the casing 18, the outer air is guided by the guide plates 76 through the gap between the liquid crystal panel 28 and the first protective cover 34, and the gap between the liquid crystal panel 28 and the second protective cover 36, and flows to the exhaust fans 66. Then, the outer air is exhausted from the casing 18 through the slits 64. Therefore, when the exhaust fans 66 are rotated, the outer air is circulated in the casing 18. Since the outer air flows along the first and second surfaces 30 and 32 of the liquid crystal panel 28, the liquid crystal panel 20 can be effectively cooled. As a result, the liquid crystal panel 28 is prevented from overheat, thus realizing a stable operation of the liquid crystal panel 28.

With circulation of outer air in the casing 18, when dust is attached to the first and second surfaces 30 and 32 of the liquid crystal panel 28, and the inner surfaces of the first and second protective covers 34 and 36, i.e., the inner surface of the transparent cover plate 40, and cleaning is required, as described above, the first and second protective covers 34 and 36 can be easily removed from the casing 18, thereby allowing easy cleaning.

In this embodiment, since the air filters 74 are respectively disposed in the regions A and B in the casing 18, clean outer air is fed in the casing 18. Therefore, the above-mentioned cleaning operation need not be frequently performed.

Figure 8:
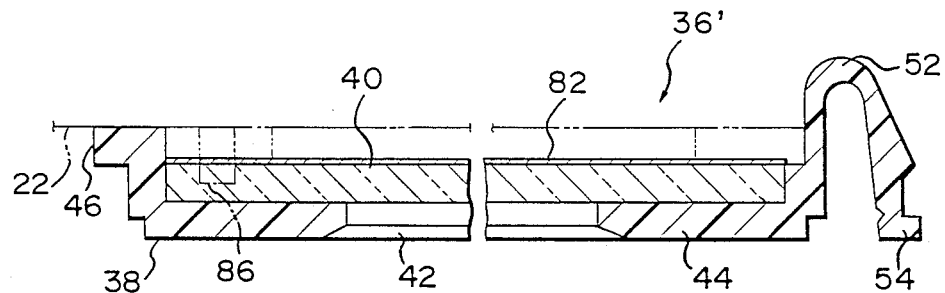
FIG. 8 is an enlarged sectional view of a second protective cover of the presentation device.

The present invention is not limited to the above embodiment, and various modifications may be made. For example, referring to FIGS. 8 and 9, a second protective cover 36' according to a second embodiment of the present invention is shown. The second protective cover 36' basically has the same structure as that of the second protective cover 36 in the first embodiment. Therefore, the same reference numerals in the second embodiment denote the same parts as in the first embodiment, a description thereof is omitted, and only different parts are described below.

The protective cover 36' in the second embodiment is formed with a reflecting film 82 of a transparent material for reflecting heat to the inner surface of a transparent cover plate 40. When such a reflecting film 82 is provided, heat from an overhead projector 10 can be reflected back to the projector side. Therefore, overheat of a liquid crystal panel 28 can be further effectively suppressed.

Figure 9:
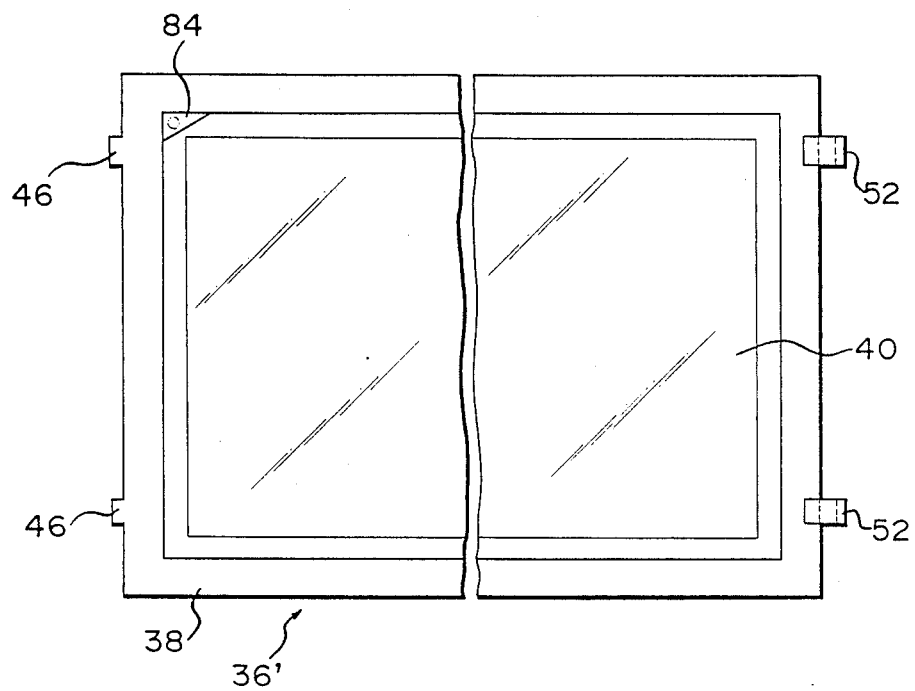
FIG. 9 is a plan view of the second protective cover shown in FIG. 8 when viewed from its inside.

As shown in FIG. 9, one corner of the cover plate 40 is cut. Therefore, a recess 84 is formed in the second protective cover 36' to expose a part of the inner surface of a mounting flange 44 in a frame 38.

A pin 86 extends from a holding flange 48 of a lower casing 22, to which the second protective cover 36' is mounted, so as to correspond to the above-mentioned recess 84. The pin 86 has a length such that it does not abut against the mounting flange 44 of the second protective cover 36' but extends in the recess 84 when the second protective cover 36' is mounted to a casing 18.

With the above-mentioned second protective cover 36', even if the first protective cover 34 is mounted to the lower casing 22 in place of the second protective cover 36', the pin 86 of the lower casing 22 does not allow the first protective cover 34 to be mounted on the lower casing 22. As a result, the first and second protective covers 34 and 36' are not erroneously mounted to the casing 18.

What is claimed is:

1. A presentation device used in a combination with an overhead projector, comprising:
    a frame-shaped casing for defining first and second openings opposing each other;
    a transmissive-type liquid crystal panel fixed in said casing, said liquid crystal panel having first and second surfaces respectively opposing said first and second openings;
    a first protective cover spaced apart from said first surface of said liquid crystal panel by a predetermined gap, and positioned to close said first opening of said casing, said first protective cover having a transparent area through which said first surface of said liquid crystal panel can be externally observed;
    a second protective cover spaced apart from said second surface of said liquid crystal panel by a predetermined gap, and positioned to close said second opening of said casing, said second protective cover having a transparent area through which said second surface of said liquid crystal panel can be externally observed;
    first engaging means for selectively engaging and disengaging said first protective cover with said casing, said first engaging means including a locking pawl extending from an outer edge of said first protective cover, an insertion recess formed in an inner edge of said first opening of said casing for receiving said locking pawl, an elastically deformable locking piece formed on an outer edge of said first protective cover, said locking piece being spaced apart from said locking pawl, and a fitting recess formed on an inner edge region of said first opening of said casing for receiving and retaining said locking piece upon elastic deformation of said locking piece;
    second engaging means for detachably engaging said second protective cover with said casing, said second engaging means including a locking pawl extending from an outer edge of said second protective cover, an insertion recess formed in an inner edge of said second opening of said casing for receiving said locking pawl, an elastically deformable locking piece formed on an outer edge of said second protective cover, said locking piece being spaced apart from said locking pawl, and a fitting recess formed on an inner edge region of said second opening of said casing for receiving and retaining said locking piece upon elastic deformation of said locking piece; and
    cooling means for cooling said liquid crystal panel by feeding outer air into said casing, causing the outer air to flow along said first and second surfaces of said liquid crystal panel, and thereafter for exhausting the air from said casing.

2. A device according to claim 1, wherein each of said locking pieces has a U-shape, one end of each of which is coupled to said casing and the other end of each of which is a free end, and each of said fitting recesses is a fitting hole in which said each of said locking pieces can be inserted upon elastic deformation from the curved portion thereof.

3. A device according to claim 2, wherein said locking pieces respectively have engaging pawls respectively engaged with the fitting holes when said locking pieces are inserted in said fitting holes, respectively.

4. A device according to claim 3, wherein the free end of each of said locking pieces is positioned in a plane including an outer surface of said casing when said locking pieces are respectively fitted in said fitting holes, and a recess is formed in the outer surfaces of said casing to allow hooking of a finger on the free end of said each locking piece fitted in said corresponding fitting hole.

5. A device according to claim 4, wherein said locking pawls and said locking pieces are integrally formed with said first and second protective covers, respectively.

6. A device according to claim 5, wherein said first and second protective covers respectively comprise said locking pawls and said locking pieces on outer surfaces thereof, a frame of a synthetic resin which defines said openings, and a transparent plate mounted on said frame to close said openings.

7. A device according to claim 6, wherein said protective cover, positioned at a lower side when said device is used, comprises a transparent reflecting film for reflecting heat to said transparent plate.

8. A device according to claim 7, wherein said presentation device further comprises discriminating means for discriminating said first and second protective covers.

9. A device according to claim 8, wherein said discriminating means comprises a recess formed by recessing a part of an outer edge of said transparent plate of one of said first and second protective covers, and a projecting portion, formed on said casing, for projecting into said recess when said one of said protective covers is mounted on said corresponding opening.

10. A presentation device used in a combination with an overhead projector, comprising:
    a frame-shaped casing for defining first and second openings opposing each other;
    a transmissive-type liquid crystal panel fixed in said casing, said liquid crystal panel having first and second surfaces respectively opposing said first and second openings;
    a first protective cover spaced apart from said first surface of said liquid crystal panel by a predetermined gap, and positionable to close said first opening of said casing, said first protective cover having a transparent area through which said first surface of said liquid crystal panel can be externally observed;
    a second protective cover spaced apart from said second surface of said liquid crystal panel by a predetermined gap, and positionable to close said second opening of said casing, said second protective cover having a transparent area through which said second surface of said liquid crystal panel can be externally observed;

first engaging means for selectively engaging and disengaging said first protective cover with said casing;
first releasing means for releasing said engagement of said first protective cover and said casing thereby allowing said first protective cover to be removed from said first opening of said casing;
second engaging means for selectively engaging and disengaging said second protective cover with said casing;
second releasing means for releasing said engagement of said second protective cover and said casing thereby allowing said second protective cover to be removed from said second opening of said casing; and
cooling means for cooling said liquid crystal panel by feeding outer air into said casing, causing the outer air to flow along with first and second surfaces of said liquid crystal panel, and thereafter for exhausting the air from said casing.

* * * * *